(No Model.)
J. G. WELDON.
APPARATUS FOR BROILING MEATS.
No. 493,801. Patented Mar. 21, 1893.
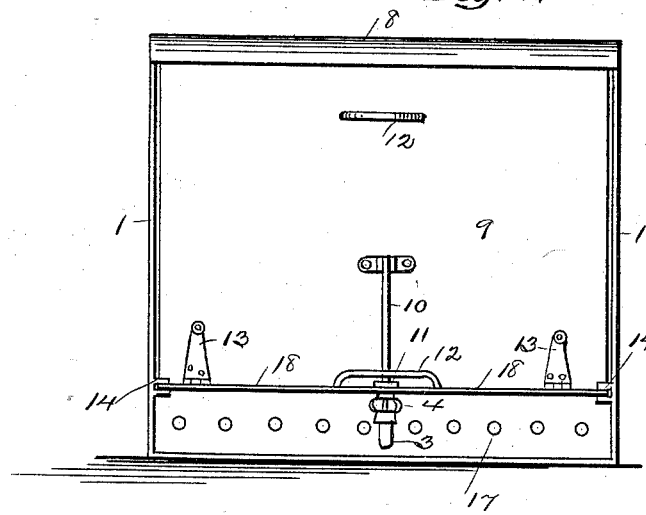
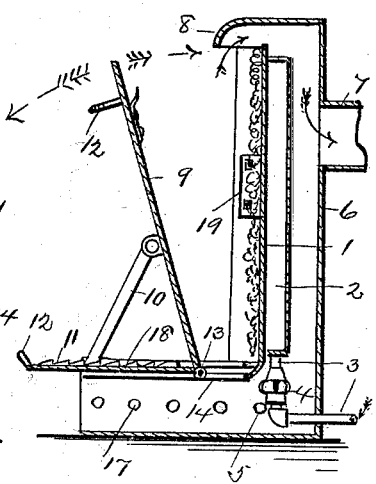
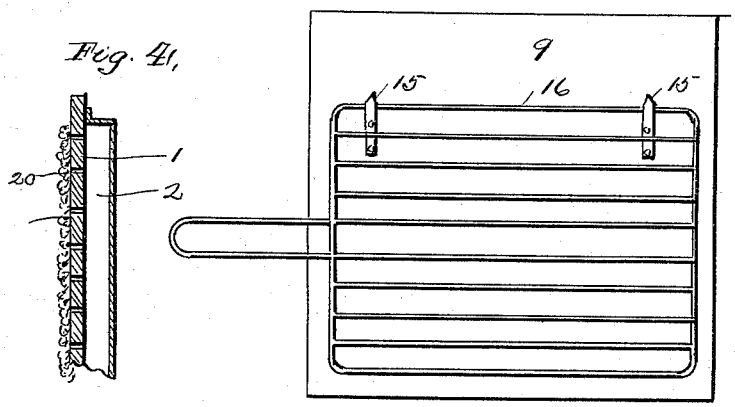

UNITED STATES PATENT OFFICE.

JAMES G. WELDON, OF PITTSBURG, PENNSYLVANIA.

APPARATUS FOR BROILING MEATS.

SPECIFICATION forming part of Letters Patent No. 493,801, dated March 21, 1893.

Application filed October 4, 1892. Serial No. 447,840. (No model.)

*To all whom it may concern:*

Be it known that I, JAMES G. WELDON, a citizen of the United States, residing at Pittsburg, in the county of Allegheny and State of Pennsylvania, have invented certain new and useful Improvements in Apparatus for Broiling Meats; and I do hereby declare the following to be a full, clear, and exact description of the invention, such as will enable others skilled in the art to which it pertains to make and use the same, reference being had to the accompanying drawings, which form a part of this specification.

My invention relates to an improved broiler for broiling meat, and consists in certain details of construction and combination of parts as will be fully described hereinafter.

In the accompanying drawings, Figure 1 is a front elevation of my improved broiling device, which is constructed in accordance with my invention. Fig. 2 is a side sectional elevation of the same. Fig. 3 is an enlarged side sectional elevation of a portion of the burner, used in connection with my improved device. Fig. 4 is a rear elevation of the front door, showing the broiler attached thereto.

To construct a device for broiling meat by means of a natural gas fire, I provide a sheet metal heater consisting of the rear wall 6, provided with a flue 7, an overhanging top 8, and an outwardly extending base in which is mounted a horizontally sliding plate 18. This plate 18 is operated between slides 14, and is provided with a handle 12 secured at its forward edge, and a rack bar 11, attached transversely across the middle of the same. Hinged to this plate is a swinging door 9, capable of being set in a vertical, inclined or horizontal position, and adapted to cover the entire front of the burner hereinafter described. Pivoted to this door 9 is a rest 10 adapted to engage with the teeth of the ratchet 11 and hold the door in any desired position. Attached to the rear of this door 9, (see Figs. 2 and 3) are two hooks 15 on which an ordinary folding wire broiler 16 is attached between the folds of which the meat is placed. Mounted in a vertical position opposite the door 9 is a burner consisting of an asbestus board 1, having a series of horizontally arranged perforations 20 through the same, and a compartment 2 at the rear.
This burner is secured to the ends of the apparatus by means of clips 19, and arranged in a position to leave a space at the top for the waste products of combustion to pass over the said burner, and escape through the flue 7. Entering the compartment 2 at the rear of the burner 1, is a gas inlet pipe 3 provided with a suitable air mixer 4, whereby gas may be admitted into the compartment and escape through the perforations 20. These perforations 20 are arranged in parallel lines over the entire surface of the asbestus board, and the said front surface of the board covered with asbestus fiber, mineral wool, or other refractory fibrous material.

In operation the meat is placed between the folds of the broiler 16, and the same hung on the hooks 15, as shown at Fig. 3 on the drawings. The gas escaping through the perforations of the burner, will burn evenly over the entire surface of the same, and form an intense heat after the fibrous material has become heated. The door may be adjusted toward, away from, or in an inclined position with the burner at the option of the operator, and held in the position desired by means of the ratchet 18 and bar 10, until the meat has been cooked.

Having thus described my invention, what I claim, and desire to secure by Letters Patent, is—

The herein described apparatus for broiling meat consisting of the sheet metal heater constructed as described, the sliding plate 18 arranged to move in a horizontal plane, the door 9 hinged thereto capable of being arranged in a vertical, inclined, or horizontal position, suitable means for supporting said door, hooks or other means for holding the broiler to the rear of the door 9, and a burner having an asbestus fibrous front, and gas compartment at the rear, all arranged and combined for service substantially as and for the purpose described.

In testimony that I claim the foregoing I hereunto affix my signature this 13th day of September, A. D. 1892.

JAMES G. WELDON. [L. S.]

In presence of—
ALBERT J. WALKER,
M. E. HARRISON.